Dec. 12, 1933. W. F. WAHL 1,939,423
ANTITHEFT CONSTRUCTION FOR VEHICLE FUEL TANKS
Filed Sept. 21, 1932
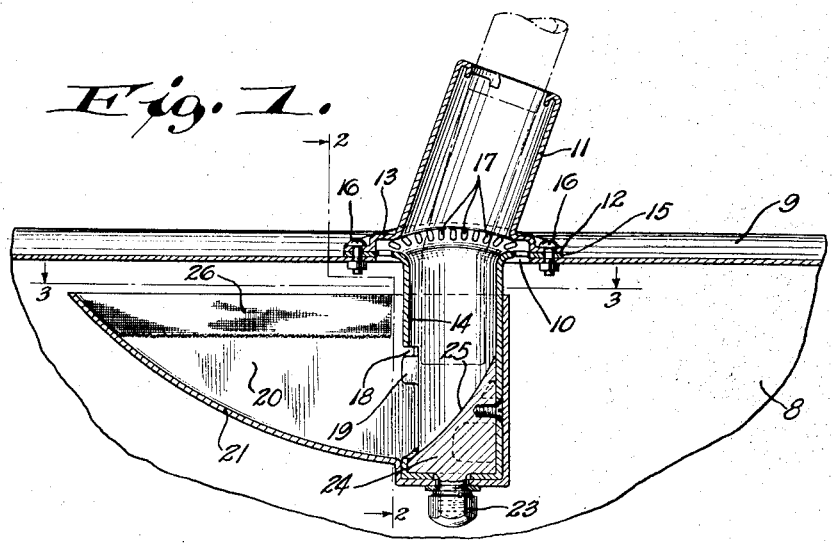
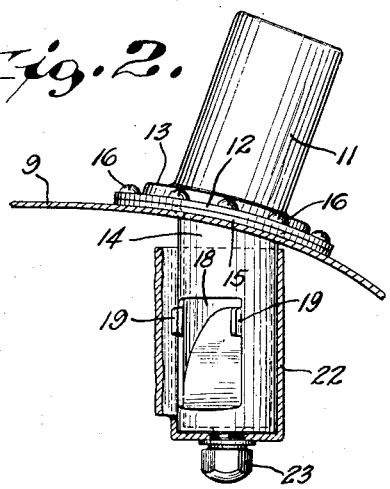
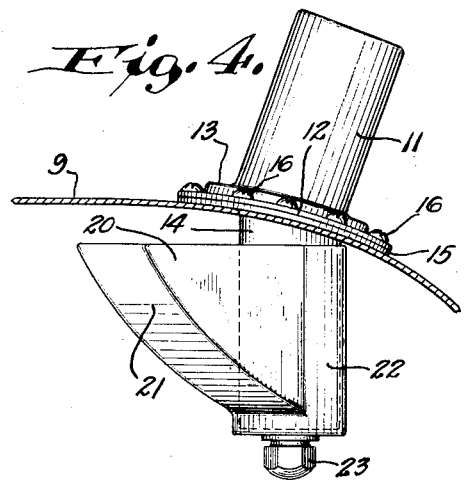
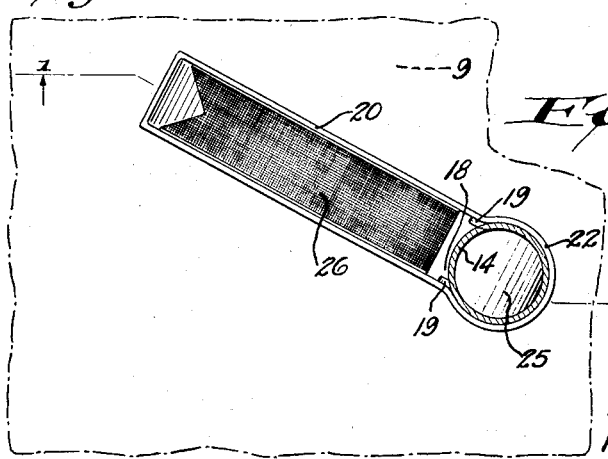
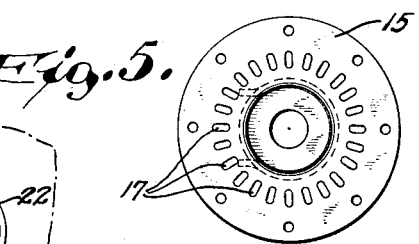
INVENTOR.
William F. Wahl,
BY
Morsell, Lieber & Morsell
ATTORNEYS.

Patented Dec. 12, 1933

1,939,423

UNITED STATES PATENT OFFICE 1,939,423

ANTITHEFT CONSTRUCTION FOR VEHICLE FUEL TANKS

William F. Wahl, Milwaukee, Wis., assignor of one-tenth to August C. Winters, Milwaukee, Wis.

Application September 21, 1932
Serial No. 634,111

7 Claims. (Cl. 220—86)

This invention relates to improvements in antitheft constructions of vehicle fuel tanks.

The ordinary fuel or gasoline tank for a motor vehicle is provided with a cap closed filling neck, and vehicle owners have been subjected to the annoyance of having fuel stolen through the medium of siphoning tubes inserted into the tanks through the filling necks.

It is, therefore, the primary object of the present invention to provide an anti-theft construction applicable, with relatively little modification, to standard fuel tanks for vehicles, and constructed so as to prevent the insertion of a flexible tube into the tank proper with the result that the theft of fuel, through siphoning, will be limited to a negligible quantity.

Heretofore, devices have been proposed for the prevention of tank fuel theft by siphoning, but in all such prior devices baffles, restrictive walls, or inner containers have been arranged within the fuel tank adjacent the filling neck in such manner that said arrangements seriously hinder or retard the introduction of gasoline into the tank.

The present invention overcomes the above objection by providing a construction which in no way retards the introduction of fuel and in addition, guarded air vents are provided which permit discharge of air from the tank displaced by the introduced liquid.

A further object of the invention is to provide a tank fuel anti-theft construction which permits the use of a filling neck of standard diameter, which is extremely easy to assemble and mount within the tank, and which may be readily disassembled for cleaning or repairs.

A further object of the invention is to provide a tank fuel anti-theft construction mountable within the tank adjacent the top thereof to permit of maximum protected tank capacity.

A further object of the invention is to provide an anti-theft construction for vehicle fuel tanks which is very simple, is strong and durable, is efficient in operation, and is well adapted for the purposes described.

With the above and other objects in view the invention consists of the improved anti-theft construction for vehicle fuel tanks, and its parts and combinations as set forth in the claims, and all equivalents thereof.

In the accompanying drawing in which the same reference characters indicate the same parts in all of the views:

Fig. 1 is a longitudinal, fragmentary sectional view of an upper portion of a fuel tank showing in section the improved anti-theft construction, said view being indicated on line 1—1 of Fig. 3;

Fig. 2 is a detail sectional view taken on line 2—2 of Fig. 1;

Fig. 3 is a sectional view through the filling tube taken on line 3—3 of Fig. 1;

Fig. 4 is a sectional view through the upper portion of the tank showing the anti-theft construction in elevation; and Fig. 5 is a plan view of the filling tube showing the integral air-vent flange.

Referring now more particularly to the drawing it will appear that the numeral 8 indicates a standard gasoline or fuel tank for a motor vehicle, said tank being of the type having a curved or rounded top 9. A filling opening 10 is conveniently located in said top and a filling neck 11, of circular form in cross-section, extends angularly upwardly from the opening and tank top. An important aspect of the invention is that the body portion of said filling neck is of standard diameter and its upper end portion is arranged to be controlled by a standard, removable closure cap (not shown).

The lower end portion of the filling neck 11 is formed with an annular attaching flange 12 adapted to surround the tank filling opening 10, and said attaching flange merges into an upwardly offset air-vent protecting flange 13. Adapted to cooperate with the filling neck 11 is a filling tube 14 depending into the tank 9 and formed at its upper end portion with an annular flange 15 underlying the flanges 12 and 13 of the filling neck. Bolts 16 extended through the flange 12, the peripheral portions of the flange 15 and the tank top 9 around the opening 10 connect the members 11 and 14 together and to the tank top. The flange 15, inwardly of its periphery and below the protecting flange 13, is formed with vent openings 17. As shown in Fig. 1, said vent openings communicate directly with the interior of the tank 8 so as to readily permit the escape of air displaced by fuel pumped into the tank, and said vent openings are guarded and protected by the raised flange 13 whereby they are inaccessible so far as the insertion of a small tube or instrument is concerned.

The lower side wall portion of the filling tube 14 is formed with a rectangular cut-out or opening 18 and said opening is laterally offset with respect to the longitudinal vertical plane of the tank extended through the axis of the tube 14. The tube 14, on opposite sides of said opening 18, is provided with guide lugs 19.

Adapted for disposition within the upper portion of the tank 8 and detachably carried by and registering with the filling tube 14, is a receptacle 20 having a liquid capacity of about one pint. Said receptacle 20 is shaped as best shown in Figs. 1, 3 and 4, being relatively narrow and deep at its inner end and having an upwardly outwardly curved bottom 21 to give it a spout-like construction and action. The inner end of the receptacle is formed as a cylindrical sleeve 22 to surround the filling tube 14, and the proper disposition of said receptacle with respect to the axis of the filling tube is insured by the guide lugs 19 which engage the inner side wall portions of the receptacle, as in Fig. 3, and direct it at an angle to the longitudinal plane of the tank. This directional disposition of the receptacle 20 is of considerable importance where said inner receptacle is used in a tank with a curved top for the reason that thereby the receptacle is disposed as close as possible to the top wall 9 of the tank which aids in minimizing the amount of fuel which might possibly be stolen by siphoning.

A bolt 23 extends through the bottom portions of the sleeve 22 and tube 14 and detachably holds said parts together. A baffle block 24, having a curved surface 25, is mounted within the lower end of the tube 14 so as to deflect incoming liquid through the opening 18 and into the receptacle 20. The top of the receptacle 20 is open and is covered by a screen 26.

In use the anti-theft construction is assembled and mounted within the vehicle fuel tank 8 as shown. When the tank is to be filled with fuel the nozzle end of a gasoline pump hose is inserted into the standard diameter filling neck 11 in the usual manner and gasoline is pumped through the hose. The gasoline passes into the filling tube 14 and strikes the curved surface 25 of the baffle block 24, and is directed through the opening 18 into the receptacle 20. Said receptacle 20 has a relatively small capacity and quickly fills, and the tank proper is filled by overflow from the receptacle 20 through the screened open top. During filling action of the tank air is freely discharged from the tank through the vent openings 17 which are in direct registration with the interior of the tank. Inflow of gasoline is in no way retarded by the anti-theft construction, and is aided by the spout-like formation of the inner receptacle 20.

The tank 8 may be filled to any desired level and under all conditions, after gasoline introduction, the inner receptacle 20 will be filled. If a siphon tube is inserted into the filling neck, at best it can only be extended into the receptacle 20 and all that can be siphoned from the tank is the fuel contained in the receptacle 20, which is a negligible quantity. If the fuel tank 8 is filled to capacity the amount of fuel available by siphoning will be the capacity of the receptacle 20 plus the level between the receptacle top and the top of the tank. However, due to the angular disposition of the receptacle 20 and its consequent proximity to the top of the tank, this amount is minimized. Obviously the anti-theft construction is readily removable and separable for repairs and cleaning.

From the foregoing description it will be seen that the improved anti-theft construction for vehicle fuel tanks is both simple and novel, and is well adapted for the purposes set forth.

What I claim as my invention is:

1. The combination with a liquid fuel tank having a top filling opening, of a downwardly projecting tubular member set in said opening and having a closed lower end and an aperture in a side thereof, and a separate open top, spout-like receptacle removably secured at one end to said tubular member and in communication with the aperture therein and extending laterally from said tubular member at an angle to the vertical plane of the fuel tank and with its open top in close proximity to the top of the fuel tank.

2. The combination with a liquid fuel tank having a top filling opening, of a downwardly projecting tubular member set in said opening and having a closed lower end and an aperture in a side thereof, and an open top, spout-like receptacle removably secured at one end to said tubular member and in communication with the aperture therein and extending laterally from said tubular member at an angle to the vertical plane of the fuel tank and in close proximity to the top thereof, said receptacle being relatively narrow and having an upwardly outwardly curved bottom whereby said receptacle is relatively deep at its inner end and is shallow at its outer end.

3. The combination with a liquid fuel tank having a top filling opening, of a downwardly projecting tubular member set in said opening and having a closed lower end and an aperture in a side thereof, and an open top, spout-like receptacle formed at its inner end with a sleeve surrounding the tubular member, said receptacle disposed with its open top in close proximity to a wall of the fuel tank, means for correctly positioning the receptacle with respect to the tubular member and the aperture therein, and other means for detachably securing said sleeve to the tubular member.

4. The combination with a liquid fuel tank having a top filling opening, of a downwardly projecting tubular member set in said opening and having a discharge opening in a side wall portion and a baffle in the lower portion to direct liquid toward said discharge opening, and an open top, spout-like receptacle removably secured at one end to said tubular member and in communication with said discharge opening and extending laterally from said tubular member at an angle to the longitudinal axis of the fuel tank and in close proximity to the top of the tank.

5. The combination with a liquid fuel tank having a top filling opening, of a downwardly projecting tubular member set in said opening and having a discharge opening in a side wall portion and a baffle in the lower portion to direct liquid toward said discharge opening, an open top, spout-like receptacle formed at its inner end with a sleeve surrounding the tubular member, said receptacle being disposed with its open top in close proximity to a wall of the fuel tank, means for correctly positioning the receptacle with respect to the tubular member and the discharge opening therein, and other means for detachably securing said sleeve to the tubular member, said receptacle being relatively narrow and having an upwardly, outwardly curved bottom whereby said receptacle is relatively deep at its inner end and is shallow at its outer end.

6. The combination with a liquid tank having a top filling opening, of a downwardly projecting tubular member set in said opening, an inner receptacle carried by and in communication with said tubular member, there being air vent means in said tank adjacent the filling opening, and a filling neck extending outwardly from said filling opening and formed at its inner end portion with a flange spaced from and guarding said vent openings.

7. The combination with a liquid tank having a top filling opening, of a downwardly projecting tubular member of less diameter than said filling opening having a horizontal flange surrounding the filling opening and having vent openings in said flange coincident with the filling opening, an inner receptacle carried by and in communication with said tubular member, and a filling neck extending outwardly from said filling opening and having an offset, horizontal flange at its lower end portion overhanging and spaced from the vent flange of the tubular member.

WILLIAM F. WAHL.